No. 788,691. PATENTED MAY 2, 1905.
H. E. ALBERT.
HAY PRESS.
APPLICATION FILED JUNE 18, 1904.
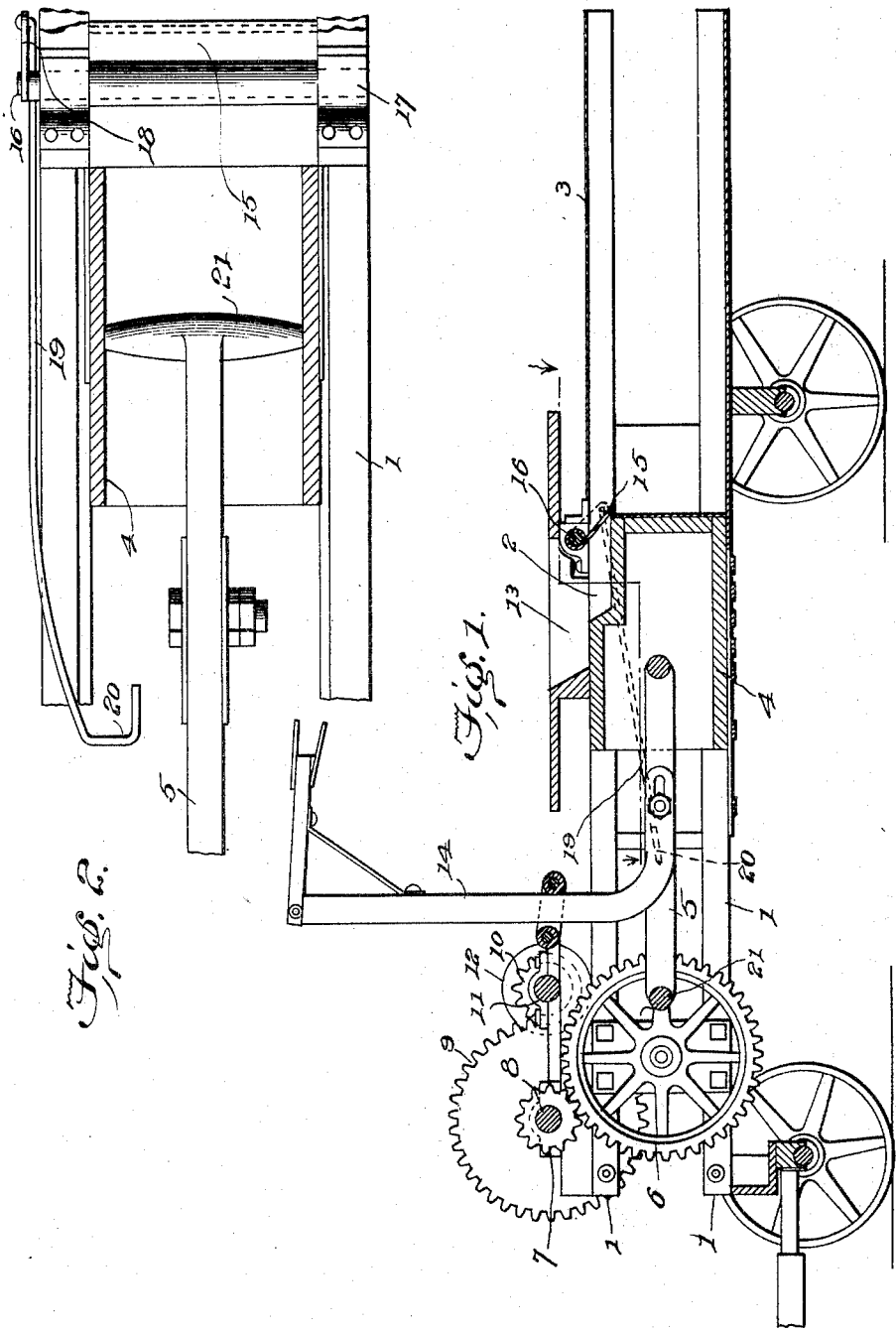
Witnesses
G. Howard Walmsley.
Irvine Miller.
Inventor
Harvey E. Albert,
By H. A. Toulmin,
Attorney No. 788,691. Patented May 2, 1905.

UNITED STATES PATENT OFFICE.

HARVEY E. ALBERT, OF WEST SALEM, OHIO, ASSIGNOR TO THE OHIO CULTIVATOR COMPANY, OF BELLEVUE, OHIO, A CORPORATION OF OHIO.

HAY-PRESS.

SPECIFICATION forming part of Letters Patent No. 788,691, dated May 2, 1905.

Application filed June 18, 1904. Serial No. 213,062.

*To all whom it may concern:*

Be it known that I, HARVEY E. ALBERT, a citizen of the United States, residing at West Salem, in the county of Wayne and State of Ohio, have invented certain new and useful Improvements in Hay-Presses, of which the following is a specification, reference being had therein to the accompanying drawings.

This invention relates to hay-presses, and has for its object to provide an improved folder and means for operating the same and also an improved bearing for the twin gear-wheels by means of which the plunger is operated.

To these ends my invention consists in certain novel features which I will now proceed to describe and will then particularly point out in the claim.

In the accompanying drawings, Figure 1 is a longitudinal sectional view, chiefly in a central vertical plane, of a hay-press embodying my invention in one form; and Fig. 2 is an enlarged view of a portion thereof in plan section upon the line between the arrows of Fig. 1.

In the said drawings, 1 represents the longitudinally-extending members of the frame, which frame may be supported upon wheels, the said machine comprising the usual press-chamber 2, baling-chamber 3, and traverser or plunger 4, driven by a pitman 5 from the twin gear-wheels 6, these latter being in turn driven by pinions 7 on the counter-shaft 8, said counter-shaft having a gear 9, which meshes with a pinion 10 on the power-shaft 11, said power-shaft being driven by a pulley 12 or in any other suitable manner. The usual opening 13 is provided for feeding in the hay, which is operated upon by the usual feeder 14. These parts may be of any approved construction.

15 indicates the folder proper, which is in the form of a plate secured to a rock-shaft 16, which extends transversely across the feed-opening 13 at the rear thereof above and practically between the press-chamber and baling-chamber. The bearings of said rock-shaft are indicated at 17. The said folder proper or folding plate hangs normally in a substantially vertical position in front of the mouth of the baling-chamber and preferably extends down into the path of the traverser, by which latter it is operated as said traverser advances, being carried over into a downwardly and rearwardly inclined position, as shown in Fig. 1, when said traverser has reached the end of its compression-stroke. This movement of the folder is effected by the traverser, either indirectly through the intervening hay or directly by contact with the traverser. The rock-shaft 16 is provided at one end with a crank-arm 18, to which is pivotally connected one end of a rod 19, the other end of which is preferably formed into a hook, as indicated at 20, and lies in the path of the other end of the traverser, so as to be engaged by the traverser upon its return movement. The construction is such that the traverser only engages the rod near the end of its outward stroke, its remaining range of outward movement being sufficient to swing the folding plate into a substantially vertical position. This downward movement of the folder folds down the overlap of hay and presses and smooths down the face of the bale, insuring a neat appearance. It will be noticed that the folder is positively operated in its working stroke and preferably in each direction, said operation being effected directly from the traverser, thus providing a simple and powerful means for actuating the folder.

It will be noted that the crank-arm 18 extends downward from the rock-shaft 16 in the same direction as the folder 15, so that said arm and folder move in the same direction. This permits the use of a rod 19, which is directly engaged by the traverser, thus doing away with any intermediate parts or connections between said rod and traverser.

I do not wish to be understood as limiting myself strictly to the precise details of construction hereinbefore described, and shown in the accompanying drawings, as the same may obviously be modified without departing from the principle of my invention.

Having thus fully described my invention, what I claim as new, and desire to secure by Letters Patent, is—

In a hay-press, a baling-chamber, a press-chamber, and a traverser, in combination with a rock-shaft provided with a folder arranged to hang normally in a substantially vertical position between the press and baling chambers, said rock-shaft having an external arm extending in the same direction therefrom as the folder, and a rod connected to said arm at one end and having its other end arranged in the path of the traverser near the end of the outer portion of said path, so as to be directly engaged by said traverser, substantially as described.

In testimony whereof I affix my signature in presence of two witnesses.

HARVEY E. ALBERT.

Witnesses:
   CHAS. H. BROWN,
   F. W. GÜNTHER.